(12) United States Patent
Nishida

(10) Patent No.: US 6,182,635 B1
(45) Date of Patent: Feb. 6, 2001

(54) CAR ENGINE CONTROLLER

(75) Inventor: Shinichi Nishida, Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/349,361

(22) Filed: Jul. 8, 1999

(30) Foreign Application Priority Data

Dec. 25, 1998 (JP) .................................................. 10-370970

(51) Int. Cl.$^7$ .................................................... F02D 45/00
(52) U.S. Cl. ........................................................... 123/399
(58) Field of Search ............................ 123/399, 198 DB, 123/480, 479, 481, 403, 198 F, 361

(56) References Cited

U.S. PATENT DOCUMENTS

| | | | |
|---|---|---|---|
| 4,335,694 | * | 6/1982 | Mausner et al. ..................... 123/478 |
| 4,453,516 | * | 6/1984 | Filsinger ............................... 477/111 |
| 4,508,078 | * | 4/1985 | Takeuchi et al. ..................... 123/399 |
| 4,519,361 | * | 5/1985 | Murakami ............................ 123/399 |
| 4,729,356 | * | 3/1988 | Kaneko et al. ....................... 123/361 |
| 5,685,277 | * | 11/1997 | Pallett et al. ......................... 123/481 |
| 5,775,295 | * | 7/1998 | Aubourg et al. ..................... 123/399 |
| 5,875,762 | * | 3/1999 | Tsuchiya et al. ..................... 123/399 |

\* cited by examiner

*Primary Examiner*—Willis R. Wolfe
*Assistant Examiner*—Hieu T. Vo
(74) *Attorney, Agent, or Firm*—Sughrue, Mion, Zinn, Macpeak & Seas, PLLC

(57) ABSTRACT

To avoid the undesired processing of a failure, a first target throttle opening is obtained from an accelerator opening, a second target throttle opening is obtained by adding the accelerator opening and a control value equivalent to the amount of bypass air, and the second target throttle opening is output when the first target throttle opening is larger than the second target throttle opening because the first target throttle opening is a computed abnormal value.

6 Claims, 13 Drawing Sheets

CAR ENGINE CONTROLLER

BACKGROUND OF THE INVENTION

1. Field of the Invention

The present invention relates to a car engine controller.

2. Description of the Prior Art

FIG. 14 is a block diagram of a car engine controller of the prior art disclosed by Japanese Laid-open Patent Application No. 6-2441105. In FIG. 14, reference numeral 101 denotes an acceleration opening sensor, 102 an air volume sensor, 103 an engine speed sensor, 104 a measuring unit, 105 a control unit, 106 an engine output control unit in the control unit 105, 107 a monitoring unit in the control unit 105, 108 a fuel control unit in the control unit 105, 109 output means, 110 a throttle actuator, 111 a fault indicator, 112 a fuel injector and "b" a connector.

A description is subsequently given of the operation of the above car engine controller. The accelerator opening sensor 101 detects the opening of an accelerator which is the operation amount of an accelerator stepped on by a driver, converts it into a signal and outputs the converted signal to the engine output control unit 106 and the monitoring unit 107. The measuring unit 104 outputs momenta such as an engine speed, engine temperature, car speed and gear ratio to the engine output control unit 106. The engine output control unit 106 computes a throttle drive signal from the opening of the accelerator input from the accelerator opening sensor 101 and the momenta input from the measuring unit 104 and control the throttle actuator 110 through the output means 109 based on the result of computation. The throttle actuator 110 adjusts the opening of the throttle valve of an engine to control the output of the engine. The air volume sensor 102 detects the amount of intake air to be absorbed to the engine side from the throttle valve, converts it into a signal and outputs the converted signal to the fuel control unit 108. The engine speed sensor 103 detects an engine speed, converts it into a signal and outputs the converted signal to the fuel control unit 108. The fuel control unit 108 computes the amount of fuel injection from the amount of intake air input from the air volume sensor 102, the engine speed input from the engine speed sensor 103 and the momenta input from the measuring unit 104 and controls the fuel injector 112 based on the result of computation. The fuel injector 112 injects fuel. The engine is thereby supplied with fuel and air required for combustion to be driven.

The monitoring unit 107 sets a maximum value for a signal indicative of a load on an operation area such as the accelerator operated by the driver according to the opening of the accelerator input from the accelerator opening sensor 101 and compares the maximum value with a load value such as the basic amount of fuel injection from the fuel control unit 108. When the load value is larger than the maximum value, the monitoring unit 107 judges that a failure occurs and outputs the result of this judgment to the engine output control unit 106, the fuel injection control unit 108, the output means 109 and the fault indicator 111. Thereby, a failure reaction or emergency driving reaction is carried out.

Since the car engine controller of the prior art is constituted as described above, the maximum value of load must be set and there is a possibility that the undesired processing of a failure is carried out according to the setting of the maximum value. The amount of load on the engine is affected by various changing factors such as the temperature and operation states of the engine and exact judgment on a failure may not be made.

It is therefore an object of the present invention to provide a car engine controller which can avoid the undesired processing of a failure by processing without making the driver know the failure even when an abnormal value is computed.

SUMMARY OF THE INVENTION

According to a first aspect of the present invention, there is provided a car engine controller which comprises means of electrically computing a throttle opening from a detected accelerator opening, means of computing a control variable by adding a control value and the detected accelerator opening, and means of controlling a throttle actuator based on the accelerator opening when the accelerator opening is smaller than the control variable and controlling the throttle actuator based on the control variable when the accelerator opening is larger than the control variable.

According to a second aspect of the present invention, there is provided a car engine controller, wherein the control value can be changed by the temperature of an engine.

According to a third aspect of the present invention, there is provided a car engine controller, wherein the control value can be changed by the temperature and burn mode of an engine.

According to a fourth aspect of the present invention, there is provided a car engine controller for controlling a throttle actuator based on a throttle opening which is electrically computed based on a detected accelerator opening and a detected throttle opening, wherein the controller comprises means of switching the burn mode of an engine to a lean burn mode when the difference between the accelerator opening and the throttle opening is large.

According to a fifth aspect of the present invention, there is provided a car engine controller for controlling a throttle actuator based on a throttle opening which is electrically computed based on a detected accelerator opening and a detected throttle opening, wherein the controller comprises means of cutting the fuel of an engine when the difference between the accelerator opening and the throttle opening is large.

According to a sixth aspect of the present invention, there is provided a car engine controller, wherein a plurality of computers forming electrical computing and control means, burn mode switching means, fuel cutting means and the like are provided.

The above and other objects, advantages and features of the present invention will become more apparent from the following description when taken into conjunction with the accompanying drawings.

BRIEF DESCRIPTION OF THE ACCOMPANYING DRAWINGS

DETAILED DESCRIPTION OF THE PREFERRED EMBODIMENTS

Embodiment 1

Figure 1:
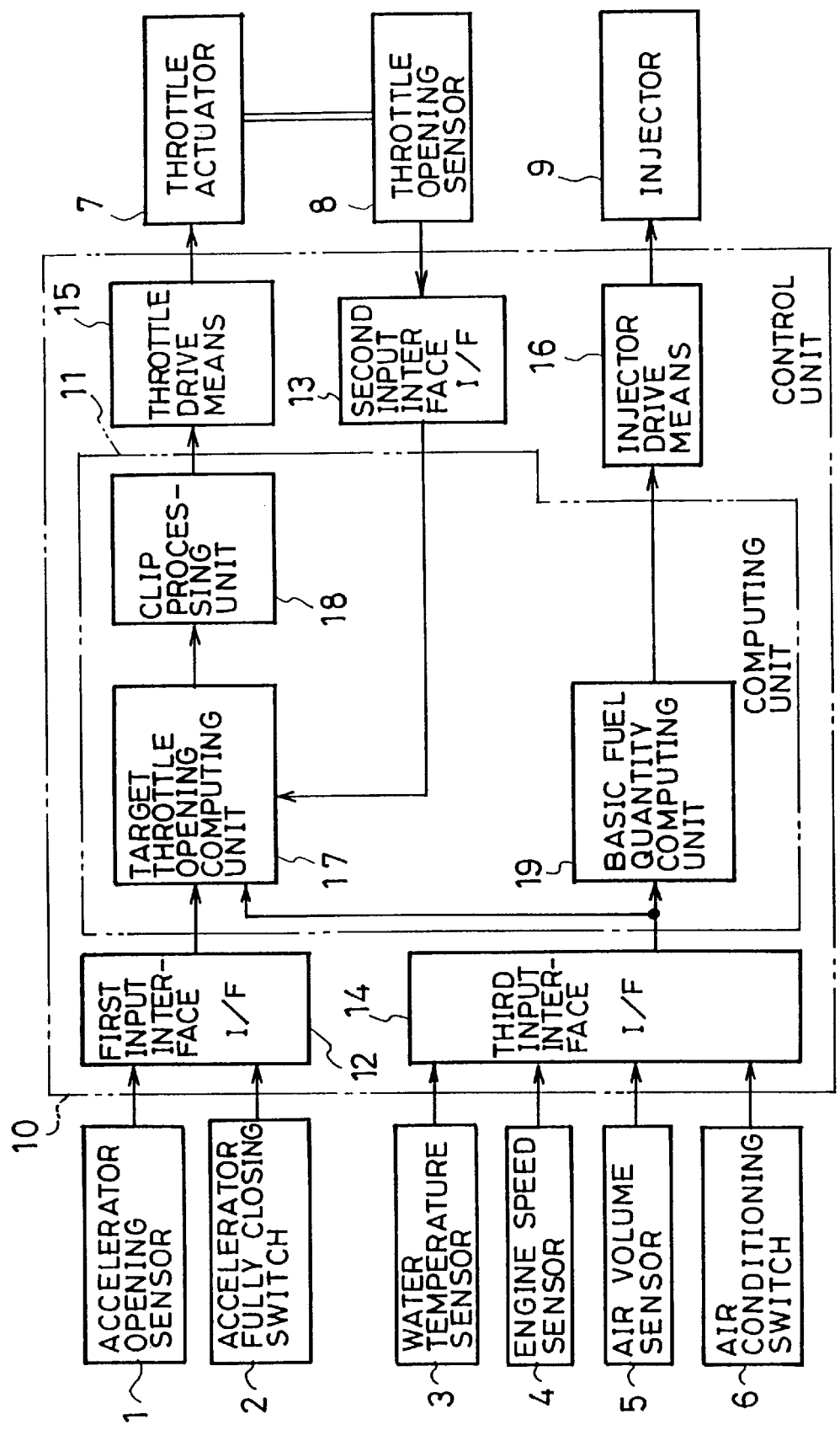
FIG. 1 is a block diagram of a car engine controller according to Embodiment 1 of the present invention.
Figure 2:
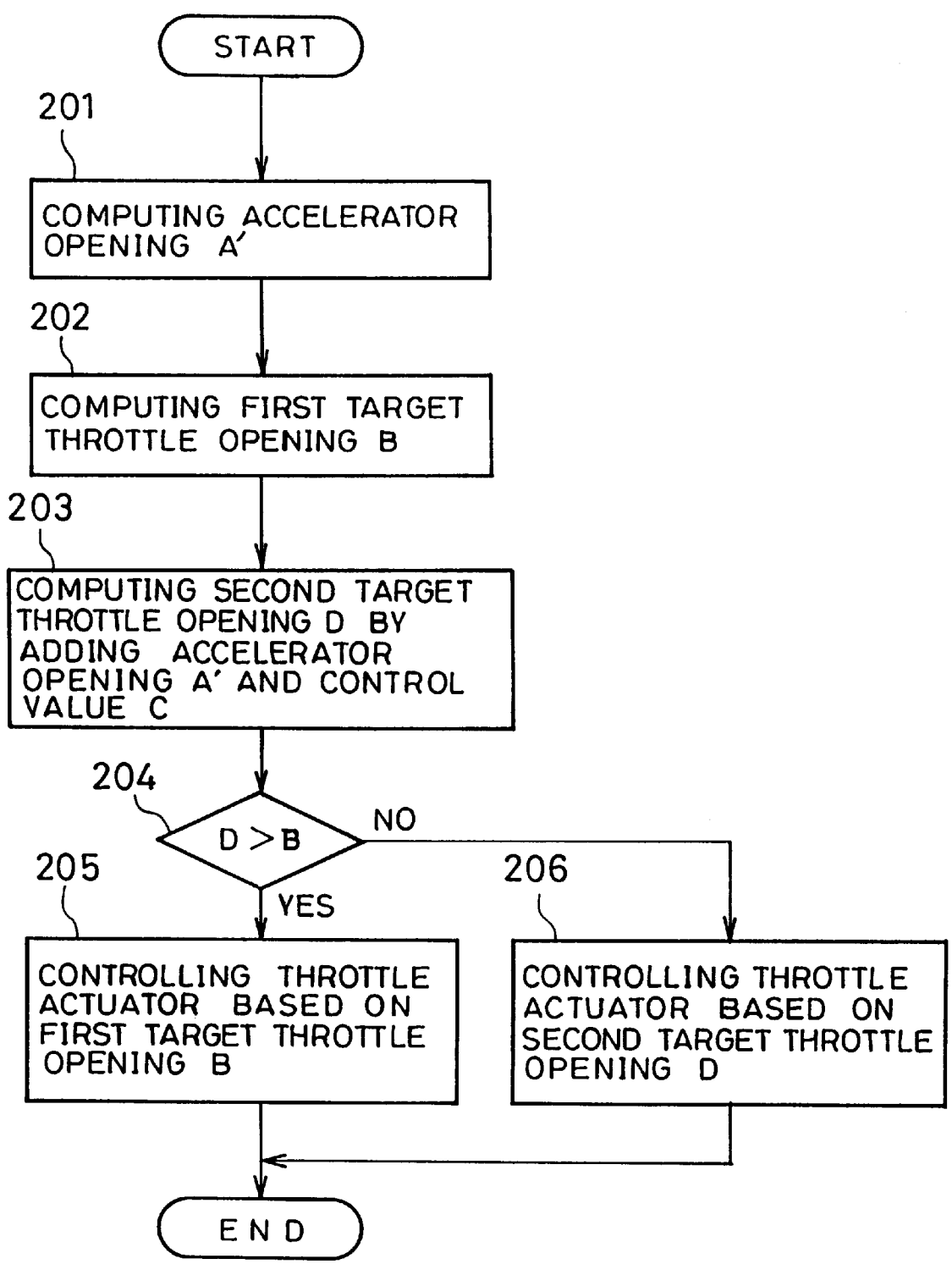
FIG. 2 is a flow chart of throttle opening control according to Embodiment 1.
Figure 3:
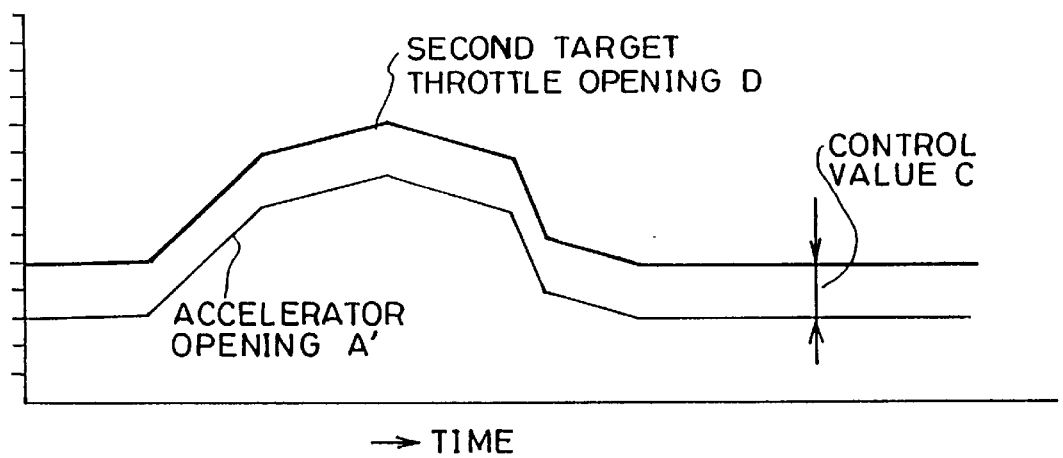
FIG. 3 is a diagram showing the relationship between accelerator opening A' and second target throttle opening D according to Embodiment 1.

FIGS. 1 to 3 show Embodiment 1 of the present invention. FIG. 1 is a block diagram of a car engine controller, FIG. 2 is a flow chart of throttle opening control and FIG. 3 is a diagram showing the relationship between accelerator opening A' and second target throttle opening D. In FIG. 1, reference numeral 1 denotes an accelerator opening sensor for detecting an accelerator opening A which is the operation amount of an accelerator stepped on by a driver, converting it into a signal and outputting the converted signal. Reference numeral 2 represents an accelerator fully closing switch, which is turned on to output a signal indicative of the fully closed position of the accelerator when the accelerator is fully closed and not operated by the driver, and turned off when the accelerator is operated by the driver. Reference numeral 3 signifies a water temperature sensor for detecting the temperature of engine cooling water, converting it into a signal and outputting the converted signal. Reference numeral 4 indicates an engine speed sensor for detecting the speed of the engine, converting it into a signal and outputting the converted signal. Reference numeral 5 denotes an air volume sensor for detecting the volume of air to be absorbed to the engine side by a throttle valve, converting it into a signal and outputting the converted signal. Denoted by 6 is an air conditioning switch for driving an air conditioning system when it is turned on, 7 a throttle actuator such as a step motor, for driving the throttle valve, 8 a throttle opening sensor for detecting the rotation position of the throttle actuator 7, converting it into a signal and outputting the converted signal as a throttle opening, and 9 fuel injectors corresponding to the number of cylinders for the engine which are illustrated as a single block in the figure.

Reference numeral 10 denotes a control unit which comprises a computing unit 11, a first input interface 12, a second input interface 13, a third input interface 14, throttle drive means 15 and injector drive means 16. The computing unit 11 is a computer whose CPU carries out processings corresponding to the operations of a target throttle opening computing unit 17, a clip processing unit 18, and a basic fuel quantity computing unit 19, using a RAM as an arithmetic processing according to a program stored in a ROM repeatedly at predetermined intervals.

The target throttle opening computing unit 17 stores an accelerator fully closed position input from the accelerator fully closing switch 2 through the first input interface 12, the accelerator opening A input from the accelerator opening sensor 1 through the first input interface 12 as an accelerator opening A' from the fully closed position of the accelerator at each cycle of computer processing, the temperature of engine cooling water, an engine speed, the amount of intake air for the engine and an air conditioning on or off signal, as engine load information input from the water temperature sensor 3, the engine speed sensor 4, the air volume sensor 5 and the air conditioning switch 6 through the third input interface 14 at each cycle of computer processing, and a throttle opening input from the throttle opening sensor 8 through the second input interface 13 at each cycle of computer processing. The target throttle opening computing unit 17 computes a first target throttle opening B in an operation state of the engine at that time from the accelerator opening A', the temperature of engine cooling water, the engine speed, the amount of intake air for the engine, the air conditioning on or off signal and the throttle opening at each cycle of computer processing and outputs it.

The clip processing unit 18 adds a predetermined control value C and the accelerator opening A' input from the target throttle opening computing unit 17 at each cycle of computer processing to obtain a second target throttle opening D (D=A'+C) (see FIG. 3). Thereafter, the clip processing unit 18 compares this second target throttle opening D with the first target throttle opening B. When the first throttle opening B is smaller than the second target throttle opening D (B<D), the clip processing unit 18 judges that the first target throttle opening B is normal and when the first throttle opening B is larger than the second target throttle opening D (B>D), it judges that the first target throttle opening B is abnormal and clips and outputs the second target throttle opening D. The control value C is a value equivalent to the volume of bypass air required for idling when the engine is driven without a load. The volume of bypass air is the volume of air to be absorbed to the engine side by bypassing the throttle valve at the time of idling in the case of a mechanical system in which the accelerator is connected to the throttle valve by a wire.

The basic fuel quantity computing unit 19 computes the basic amount of fuel required to obtain a normal mixing ratio for combustion from the temperature of engine cooling water, the engine speed, the amount of intake air for the engine and the air conditioning on or off signal input from the water temperature sensor 3, the engine speed sensor 4, the air volume sensor 5 and the air conditioning switch 6 through the third input interface 14 at each cycle of computer processing and outputs it. The throttle drive means 15 outputs to the throttle actuator 7 power corresponding to the first target throttle opening B or the second target throttle opening D input from the clip processing unit 18. The injector drive means 16 injects the amount of fuel equivalent to the basic amount of fuel input from the basic fuel quantity computing unit 19 into air to be absorbed to the engine side from the throttle valve or the cylinders.

The operation of this Embodiment 1 will be described hereinunder. When the driver inserts a key plate into the ignition key of a car and turns the key plate, and the key plate is located at a power on position from a power off position, power is supplied to the control unit 10 from the battery of the car to activate the control unit 10. The target throttle opening computing unit 17 reads and stores the fully closed position of the accelerator from the accelerator fully closing switch 2 and the accelerator opening A from the accelerator opening sensor 1. When the driver turns the key plate to a start position from the power-on position, the engine starts running. In this state, the target throttle opening computing unit 17 reads and stores the temperature of engine cooling water, an engine speed, the amount of intake air for the engine, an air conditioning on or off signal and a throttle opening from the water temperature sensor 3, the engine speed sensor 4, the air volume sensor 5, the air conditioning switch 6 and the throttle opening sensor 8, respectively. Information on the accelerator opening A, the temperature of engine cooling water, the engine speed, the volume of intake air for the engine, the air conditioning on or off signal and the throttle opening are updated at each cycle of computer processing by the computing unit 11. Since the driver does not operate (step on) the accelerator, each time the accelerator fully closed position is input into the target throttle opening computing unit 17 from the accelerator fully closing switch 2, only when the latest data is smaller than the past data at each cycle of computer processing, the target throttle opening computing unit 17 updates the latest data as an accelerator fully closed position.

Thereafter, as shown in FIG. 2, the target throttle opening computing unit 17 obtains the accelerator opening A' as a change in the accelerator opening A from the fully opened position of the accelerator (step 201) and computes the first target throttle opening B as a first control variable based on the accelerator opening A', the temperature of engine cooling water, the engine speed, the air conditioning on/off signal and the throttle opening (step 202). Thereafter, the clip processing unit 18 computes a second target throttle opening D as a second control variable obtained by adding the accelerator opening A' input from the target throttle opening computing unit 17 and the predetermined control value C and compares the first target throttle opening B with the second target throttle opening D (steps 203 and 204). When the first target throttle opening B is smaller than the second target throttle opening D, the clip processing unit 18 clips the first target throttle opening B and outputs it to the throttle drive means 15 (step 205). Conversely, when the first target throttle opening B is larger than the second target throttle opening D, the first target throttle opening B is a computed abnormal value. Since it is not preferred for safe driving to control the throttle actuator 7 based on this first target throttle opening B, the clip processing unit 18 clips the second target throttle opening D and outputs it to the throttle drive means 15 (step 206).

In short, according to Embodiment 1, when the first target throttle opening B obtained from the accelerator opening A' which is based on the fully closed position of the accelerator at each cycle of computer processing is a computed abnormal value, the throttle actuator 7 is limited to the second target throttle opening D obtained by adding the accelerator opening A' and the control value C. For example, in an electronically controlled throttle valve as in Embodiment 1, when the accelerator is stepped on by the driver and the accelerator opening A' is 1 volt, even if the target throttle opening computing unit 17 computes an abnormal value, for example, 5 volts as the first target throttle opening B, the clip processing unit 18 limits a voltage to be applied to the throttle actuator 7 to 2 volts which is the second target throttle opening D obtained by adding 1 volt which is the accelerator opening A' and 1 volt which is the control value C. Therefore, since the opening of the throttle actuator 7 is limited to a safe range even if the computing unit 11 computes an abnormal value, the driver can carry out safe driving without knowing abnormality in computation.

Embodiment 2

Figure 4:
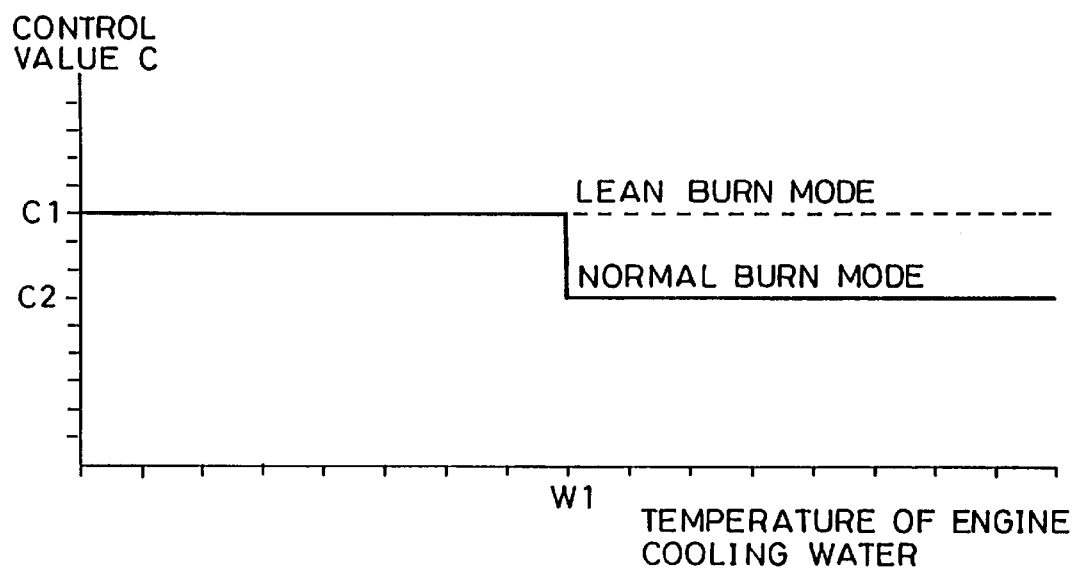
FIG. 4 is a diagram of a table according to Embodiment 2 of the present invention.

In the above Embodiment 1, the control value C is set to a predetermined value. A value based on the temperature of engine cooling water and the burn mode of the engine may be used as a control value C. FIG. 4 is a diagram of a table showing the relationship among the control value C, the temperature of engine cooling water and the burn mode of the engine according to Embodiment 2 of the present invention. In FIG. 4, when the temperature of engine cooling water is lower than W1, the control value C is set to C1 and when the temperature is higher than W1, the control value C is set to C2 (C1>C2). Thus, as the control value C varies according to the temperature of engine cooling water, even when the friction of the engine is large and a large volume of air is required, the control value C can be controlled to an appropriate value. This is due to the following fact. When the engine is cold, engine oil is highly viscous, whereby the friction of the engine increases and the volume of air required by the engine also increases. If the control value C remains unchanged at the start of the engine and after the engine is warmed up, when the throttle actuator 7 is limited to the second target throttle opening D after the engine is warmed up, the volume of air required by the engine runs short, thereby reducing the output of the engine. Therefore, even when the throttle actuator is limited to the second target throttle opening D after the engine is warmed up, the output of the engine can be made appropriate by changing the control value C according to the temperature of engine cooling water. FIG. 4 also shows that when the control value C is C1, a lean burn mode is set and when the control value C is C2, a normal burn mode is set. The values C1, C2 and W1 are determined by the relationship among the total cubic capacity of the engine, the opening of the throttle valve and the volume of intake air.

Embodiment 3

Figure 5:
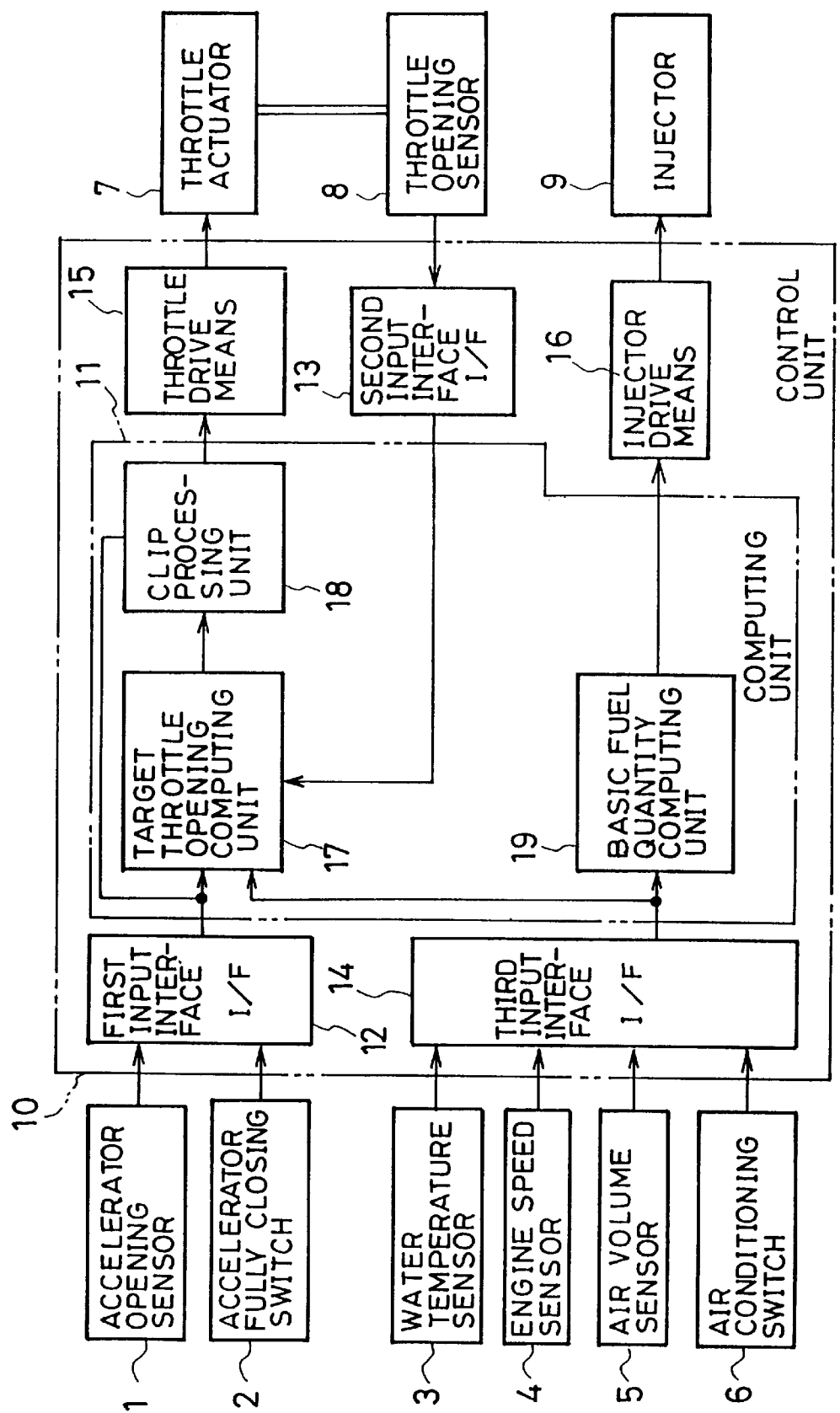
FIG. 5 is a block diagram of a car engine controller according to Embodiment 3 of the present invention.
Figure 6:
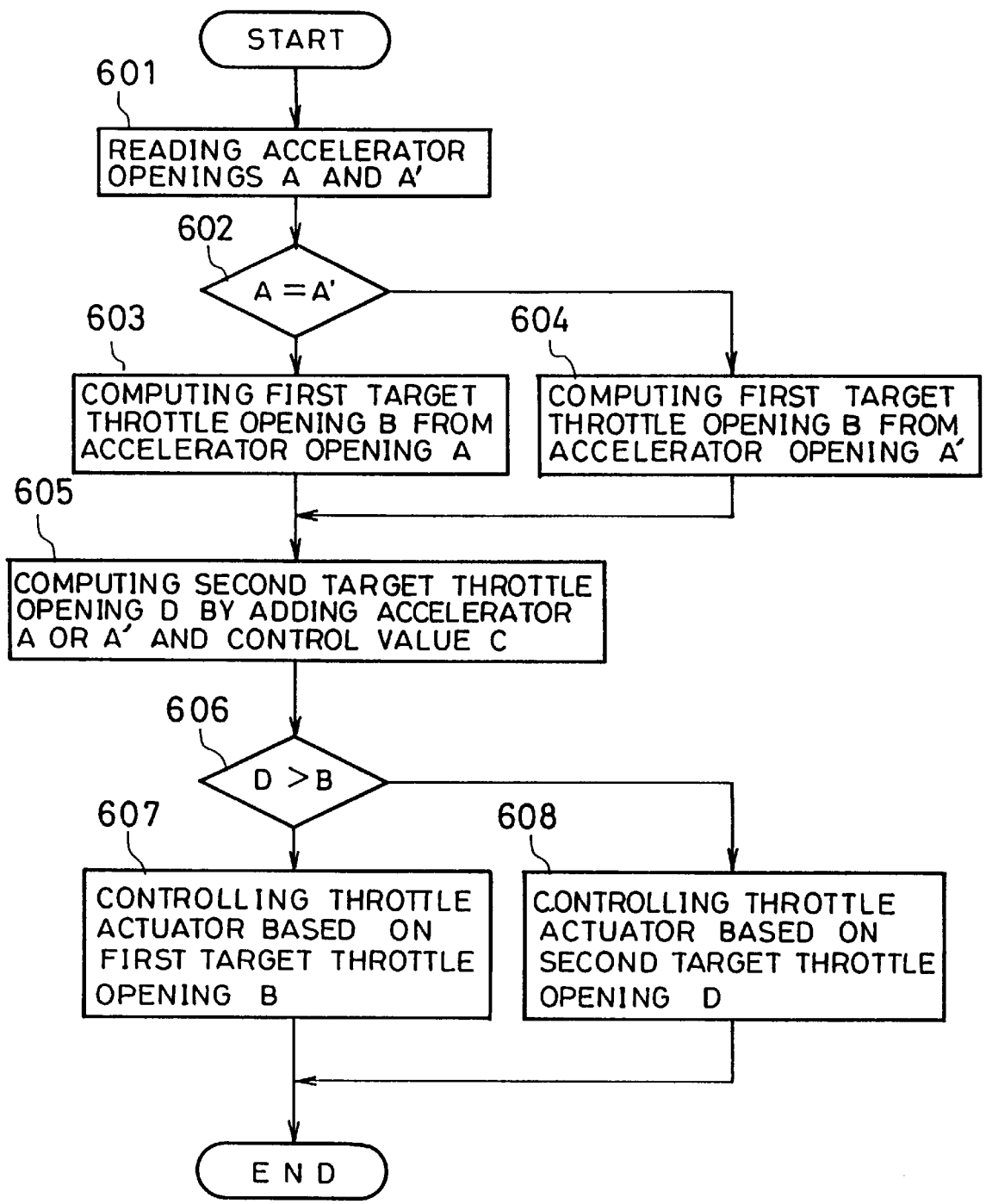
FIG. 6 is a flow chart of throttle opening control according to Embodiment 3.

FIGS. 5 and 6 show Embodiment 3 of the present invention. FIG. 5 is a block diagram of a car engine controller and FIG. 6 is a flow chart of throttle opening control. In this Embodiment 3, as shown in FIG. 5, the target throttle opening computing unit 17 and the clip processing unit 18 receive an accelerator opening A from the accelerator opening sensor 1. Thereafter, as shown in FIG. 6, the clip processing unit 18 compares the accelerator opening A', which is based on the fully closed position of the accelerator, with the accelerator opening A from the accelerator opening sensor 1. When a change in the opening of the accelerator is small as the difference between the accelerator opening A' and the accelerator opening A is small (step 602), the accelerator opening A is directly used in place of the accelerator opening A' (step 603). According to this Embodiment 3, even when the target throttle opening computing unit 17 computes an abnormal value as the accelerator opening A' which is based on the fully closed position of the accelerator, the computing unit 11 can limit the opening of the throttle actuator 7 to a safe range without making the driver know the above abnormality in computation.

Embodiment 4

Figure 7:
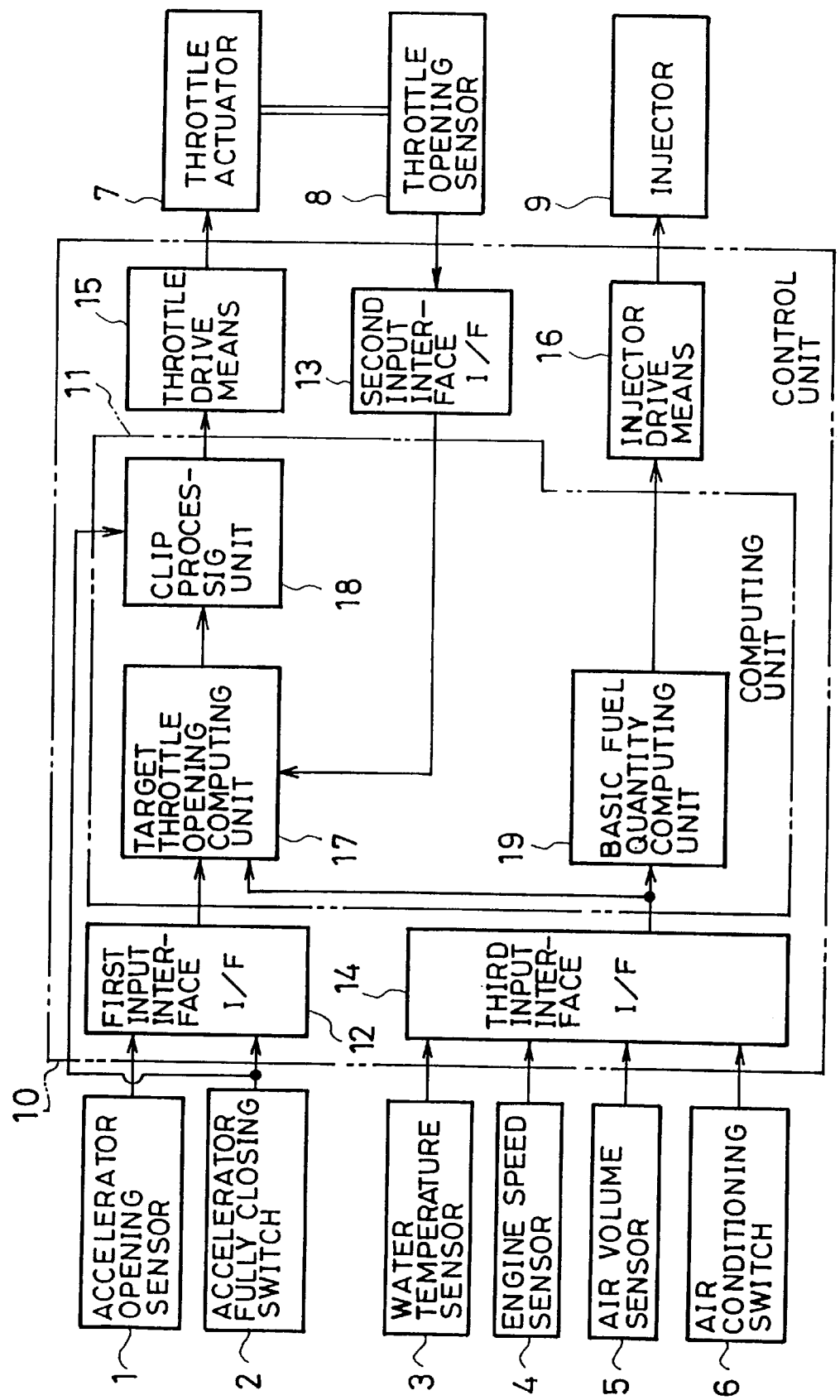
FIG. 7 is a block diagram of a car engine controller according to Embodiment 4 of the present invention.
Figure 8:
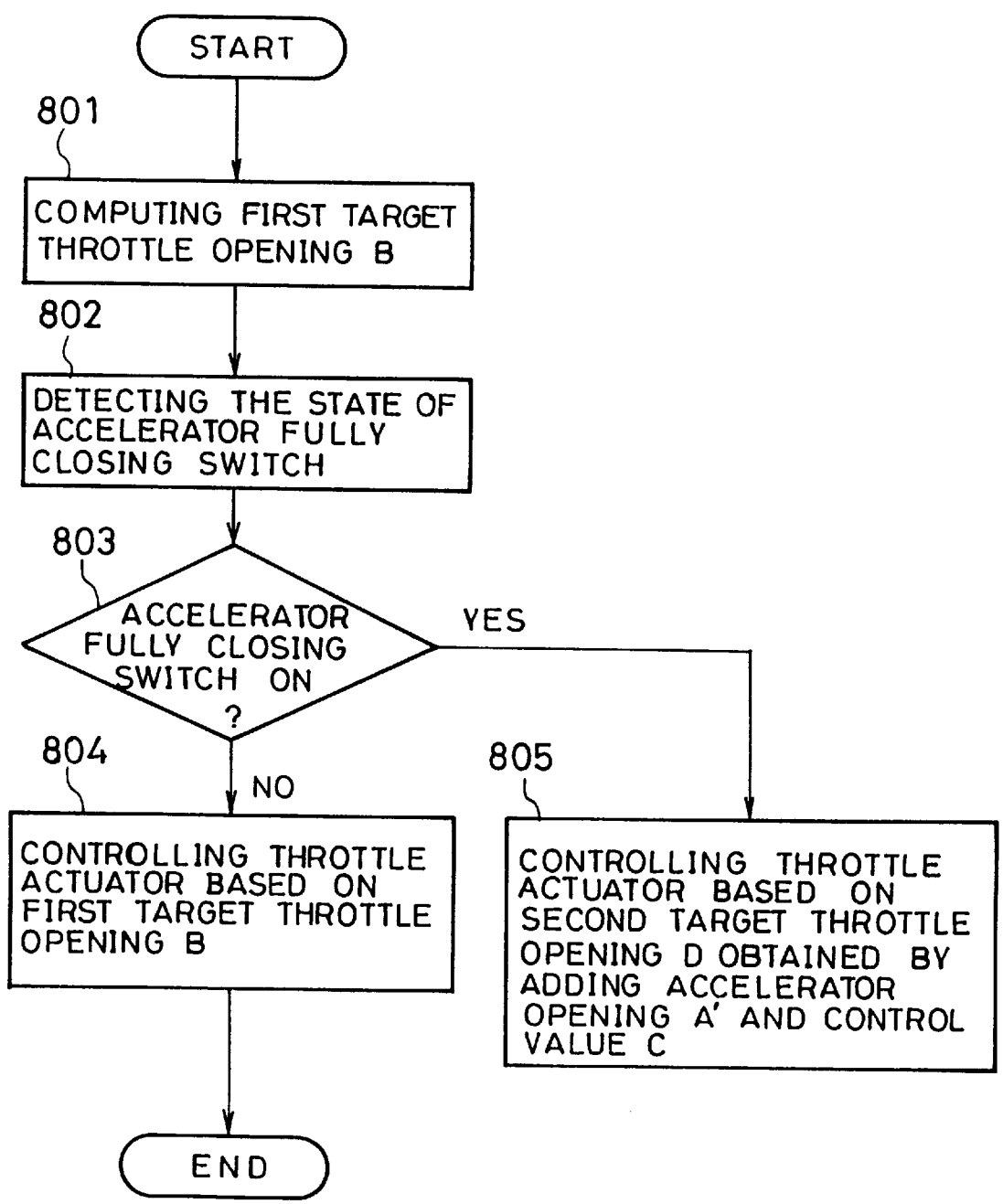
FIG. 8 is a flow chart of throttle opening control according to Embodiment 4.

FIGS. 7 and 8 show Embodiment 4 of the present invention. FIG. 7 is a block diagram of a car engine controller and FIG. 8 is a flow chart of throttle opening control. In this Embodiment 4, as shown in FIG. 7, the target throttle opening computing unit 17 and the clip processing unit 18 receives the fully closed position of the accelerator from the accelerator fully closing switch 2. As shown in FIG. 8, when the accelerator fully closing switch 2 is off and the driver steps on the accelerator (steps 802 and 803), the clip processing unit 18 outputs the first target throttle opening B received from the target throttle opening computing unit 17 directly to the throttle drive means 17 (step 804). When the accelerator fully closing switch 2 is on and the driver does not step on the accelerator, the clip processing unit 18 computes the second target throttle opening D by adding the accelerator opening A' and the control value C and outputs it to the throttle drive means 15 (step 805). Therefore, according to this Embodiment 4, the opening of the throttle actuator 7 at the idling range of the engine can be limited.

Embodiment 5

In the above Embodiments 1 to 4, the accelerator opening and the throttle opening are both based on the fully closed positions of the accelerator and the throttle valve. The present invention can be applied even when these openings are based on the fully opened positions of the accelerator and the throttle valve or any reference points. In this case, when the target throttle opening computing unit 17 is to update an accelerator opening A input from the accelerator opening sensor 1 at each cycle of computer processing, if the latest data at each cycle of computer processing is larger than the past data, the target throttle opening computing unit 17 exchanges the past data with the latest data as the fully opened position of the accelerator. When the target throttle opening computing unit 17 is to update a throttle opening input from the throttle opening sensor 8 through the second input interface 13 at each cycle of computer processing, if the latest data at each cycle of computer processing is larger than the past data, the target throttle opening computing unit 17 must exchange the past data with the latest data as the fully opened position of the throttle.

Embodiment 6

Figure 9:
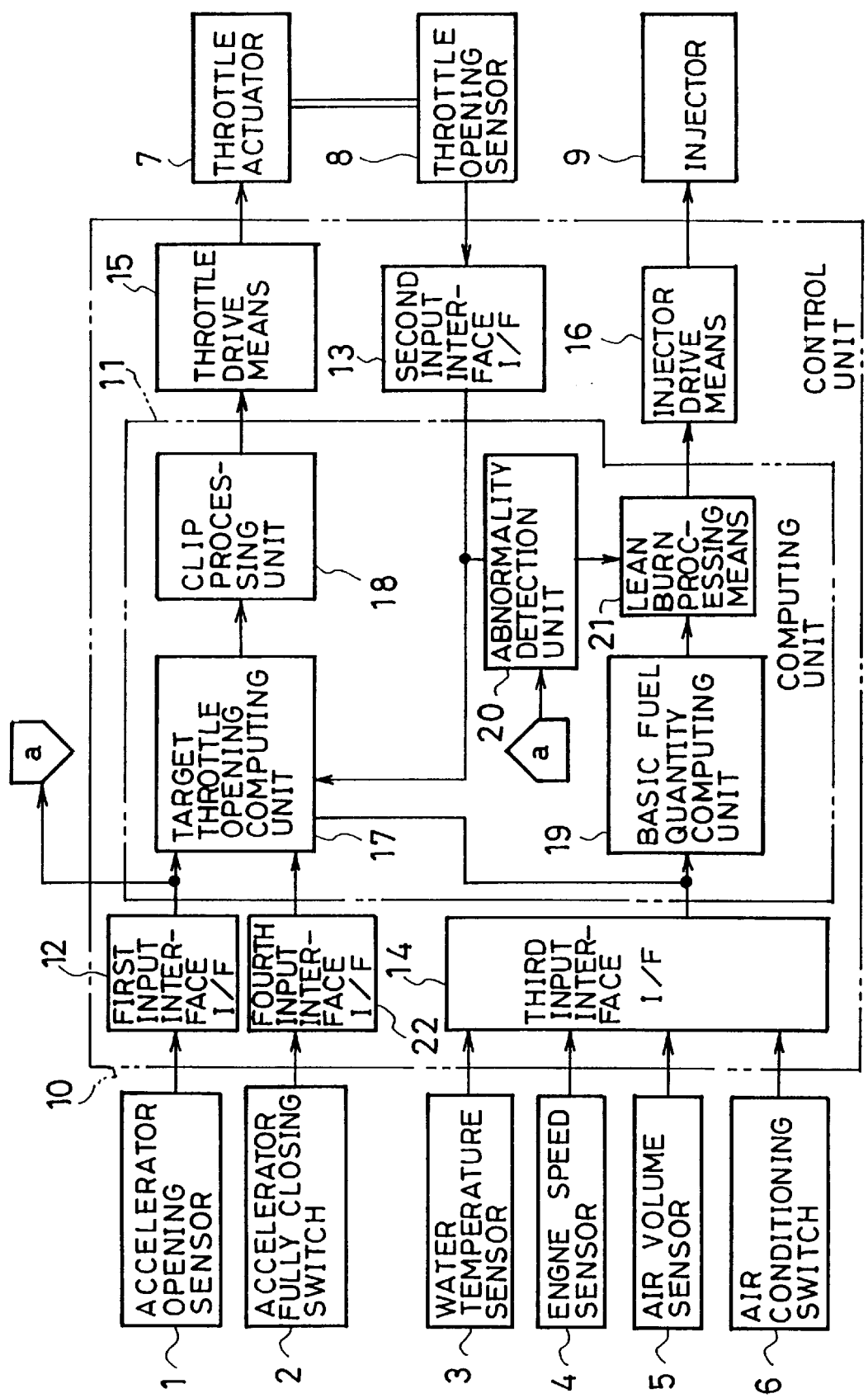
FIG. 9 is a block diagram of a car engine controller according to Embodiment 6 of the present invention.
Figure 10:
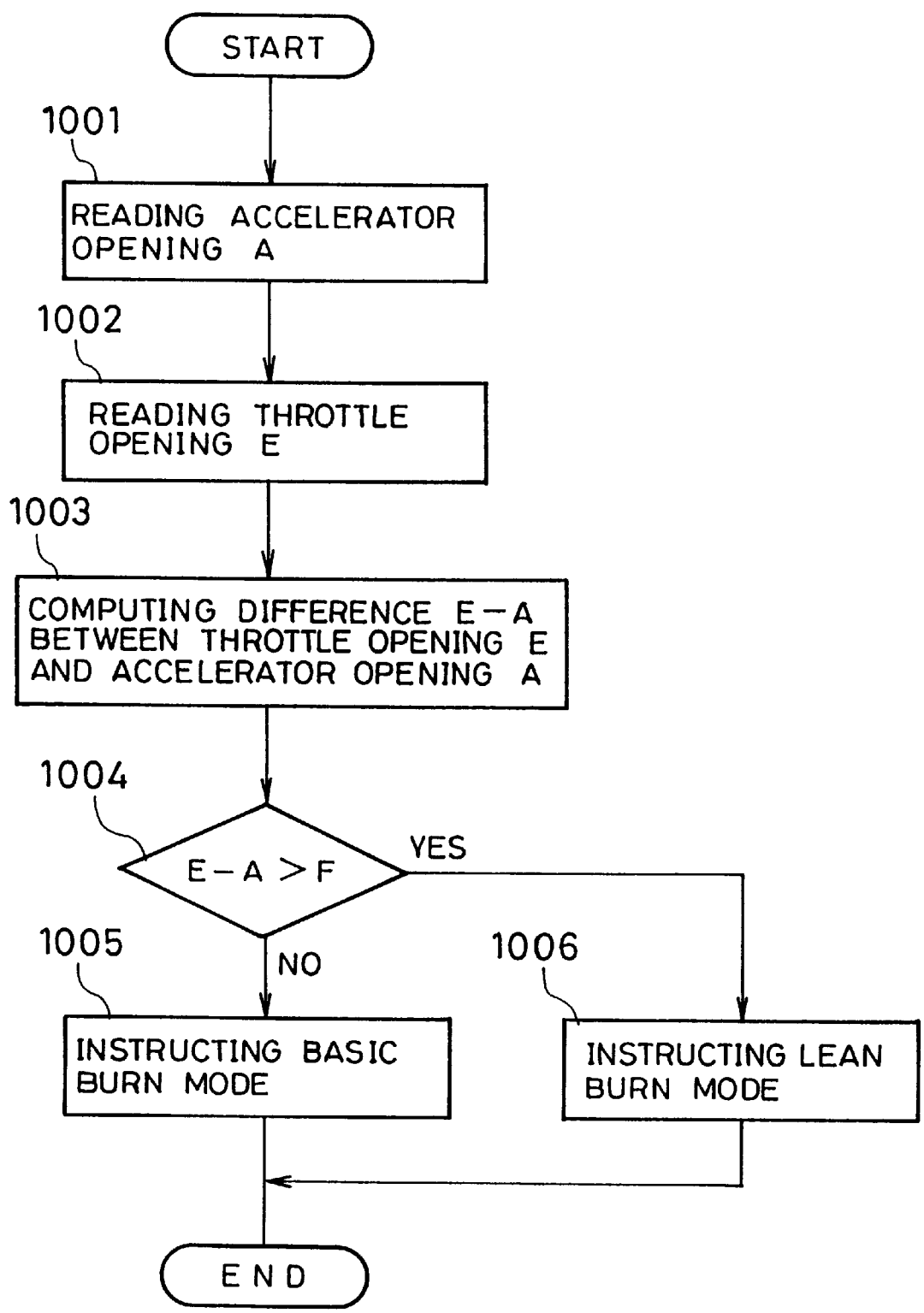
FIG. 10 is a flow chart of throttle opening control according to Embodiment 6.

FIGS. 9 and 10 show Embodiment 6 of the present invention. FIG. 9 is a block diagram of a car engine controller and FIG. 10 is a flow chart of burn mode switching control. In this Embodiment 6, as shown in FIG. 9, the computing unit 11 further comprises an abnormality detection unit 20 and a lean burn processing unit 21. The abnormality detection unit 20 receives an accelerator opening A from the accelerator opening sensor 1 through the first input interface 12 and a throttle opening from the throttle opening sensor 8 through the second input interface 13. The target throttle opening computing unit 17 receives an accelerator opening A from the accelerator opening sensor 1 through the first input interface 12 and the fully closed position of the accelerator from the accelerator fully closing switch 2 through the fourth input interface 22. The reason for this is to define the input of the accelerator opening A into the abnormality detection unit 20. Therefore, the first input interface 12 and the fourth input interface 22 may be combined into one unit. As shown in FIG. 10, the abnormality detection unit 20 reads the accelerator opening A from the accelerator opening sensor 1 and a throttle opening E from the throttle opening sensor 8 (steps 1001 and 1002). Thereafter, the abnormality detection unit 20 computes the difference E–A is between the accelerator opening A and the throttle opening E and compares the difference E–A with a predetermined decision value F (steps 1003 and 1004). When the difference E–A is smaller than the decision value F, the abnormality detection unit 20 instructs a basic burn mode to the lean burn processing unit 21 (step 1005). Then, the lean burn processing unit 21 outputs the basic amount of fuel from the basic fuel quantity computing unit 19 directly to the injector drive means 16. Conversely, when the difference E–A is larger than the decision value F, the abnormality detection unit 20 instructs a lean burn mode to the lean burn processing unit 21 (step 1006). Then, the lean burn processing unit 21 changes the basic amount of fuel input from the basic fuel quantity computing unit 19 to the amount of lean fuel predetermined according to the state of the engine at that time and outputs it to the injector drive means 16. Therefore, according to Embodiment 6, when a failure occurs in the throttle drive means 15 or the throttle actuator 7, the output of the engine is reduced by use of a lean burn mode, thereby making it possible to prevent the abrupt departure or reckless driving of a car.

Embodiment 7

Figure 11:
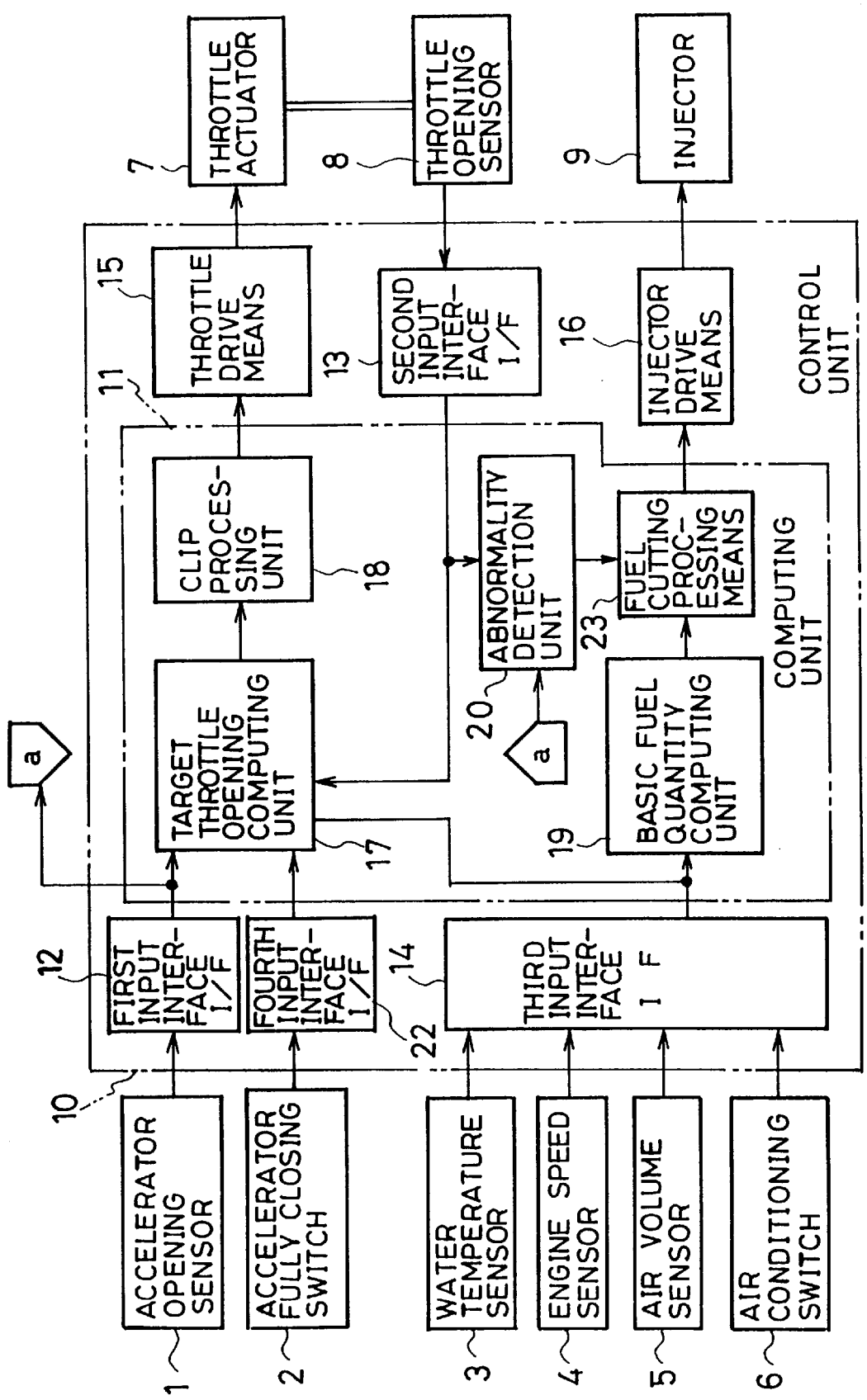
FIG. 11 is a block diagram of a car engine controller according to Embodiment 7 of the present invention.
Figure 12:
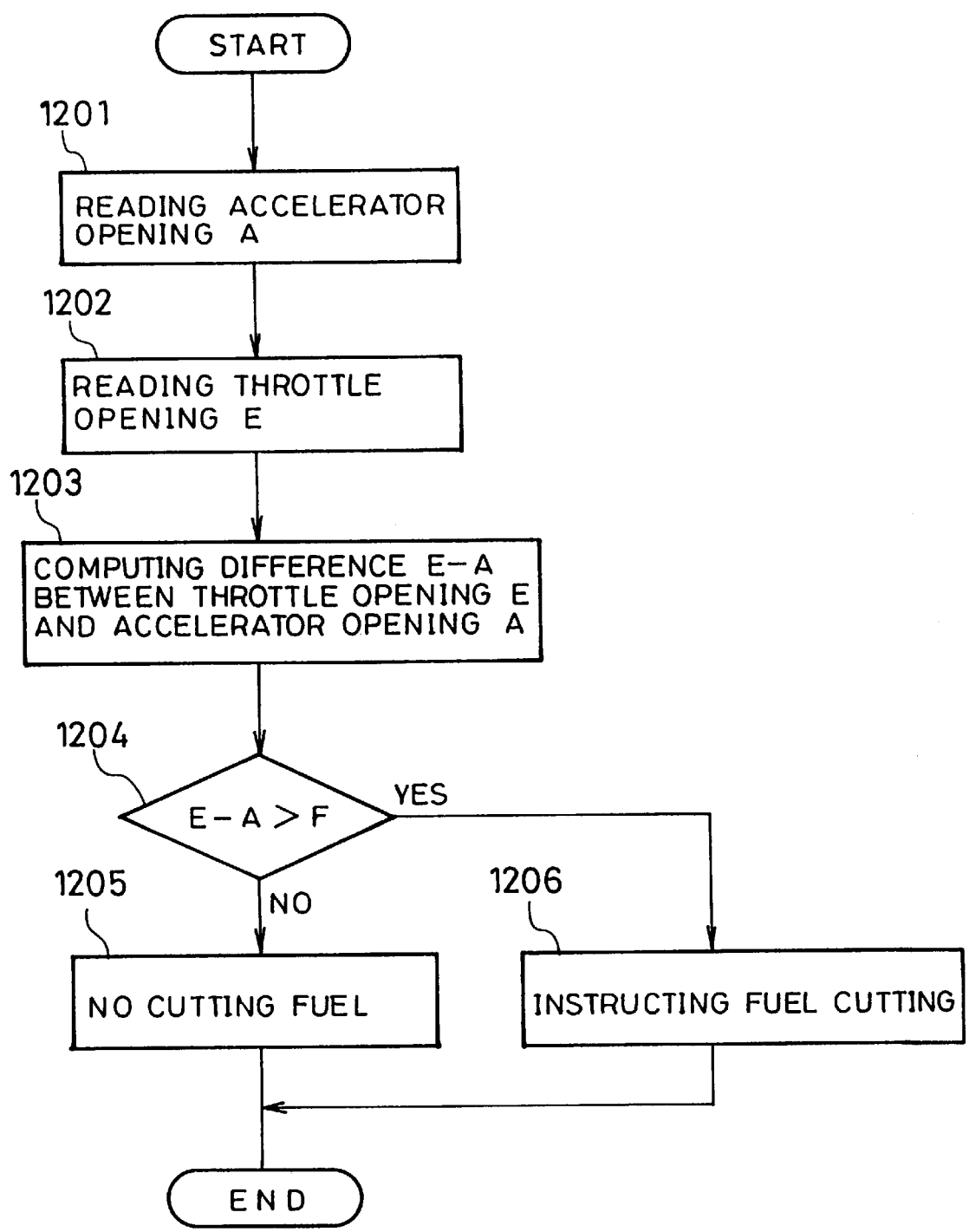
FIG. 12 is a flow chart of throttle opening control according to Embodiment 7.

In the above Embodiment 6, the output of the engine is reduced by use of a lean burn mode. The output of the engine can also be reduced by cutting fuel. FIGS. 11 and 12 show Embodiment 7 of the present invention. FIG. 11 is a block diagram of a car engine controller and FIG. 12 is a flow chart of burn mode switching control. In this Embodiment 7, as shown in FIG. 11, the computing unit 11 has a fuel cutting processing unit 23 in place of the above lean burn processing unit 21, and letter "a" denotes a connector. As shown in FIG. 12, when the difference E–A between the accelerator opening A and the throttle opening E is larger than the decision value F, the abnormality detection unit 20 instructs fuel cutting to the fuel cutting processing unit 23 (step 1206). The fuel cutting processing unit 23 changes the basic amount of fuel to the cut amount of fuel which is predetermined according to the state of the engine and outputs it to the injector drive means 16. Therefore, according to this Embodiment 7, even when a failure occurs in the throttle drive means 15 or the throttle actuator 7, the output of the engine can be reduced by a fuel cutting mode, thereby making it possible to prevent the abrupt departure and reckless driving of a car. There are the following possible cases for the processing of cutting fuel which can be carried out by the fuel cutting processing unit 23. One of them is that driving at an engine speed below a certain level is made possible by cutting the amount of fuel to be supplied to all the cylinders so that the engine speed falls below 3,000 rpm. The other case is that virtual cylinder fuel cutting that enables driving with three cylinders supplied with fuel is carried out.

Embodiment 8

In the above Embodiments 6 and 7, the abnormality detection unit 20 computes the difference E–A between the accelerator opening A and the throttle opening E. The abnormality detection unit 20 may receive the first target throttle opening B from the target throttle opening computing unit 17 in place of the accelerator opening A and obtain the difference E–B between the first target throttle opening B and the throttle opening E. When the difference E–B is larger than the decision value F, the abnormality detection unit 20 may output an instruction to the lean burn processing unit 21 or the fuel cutting processing unit 23.

Embodiment 9

Figure 13:
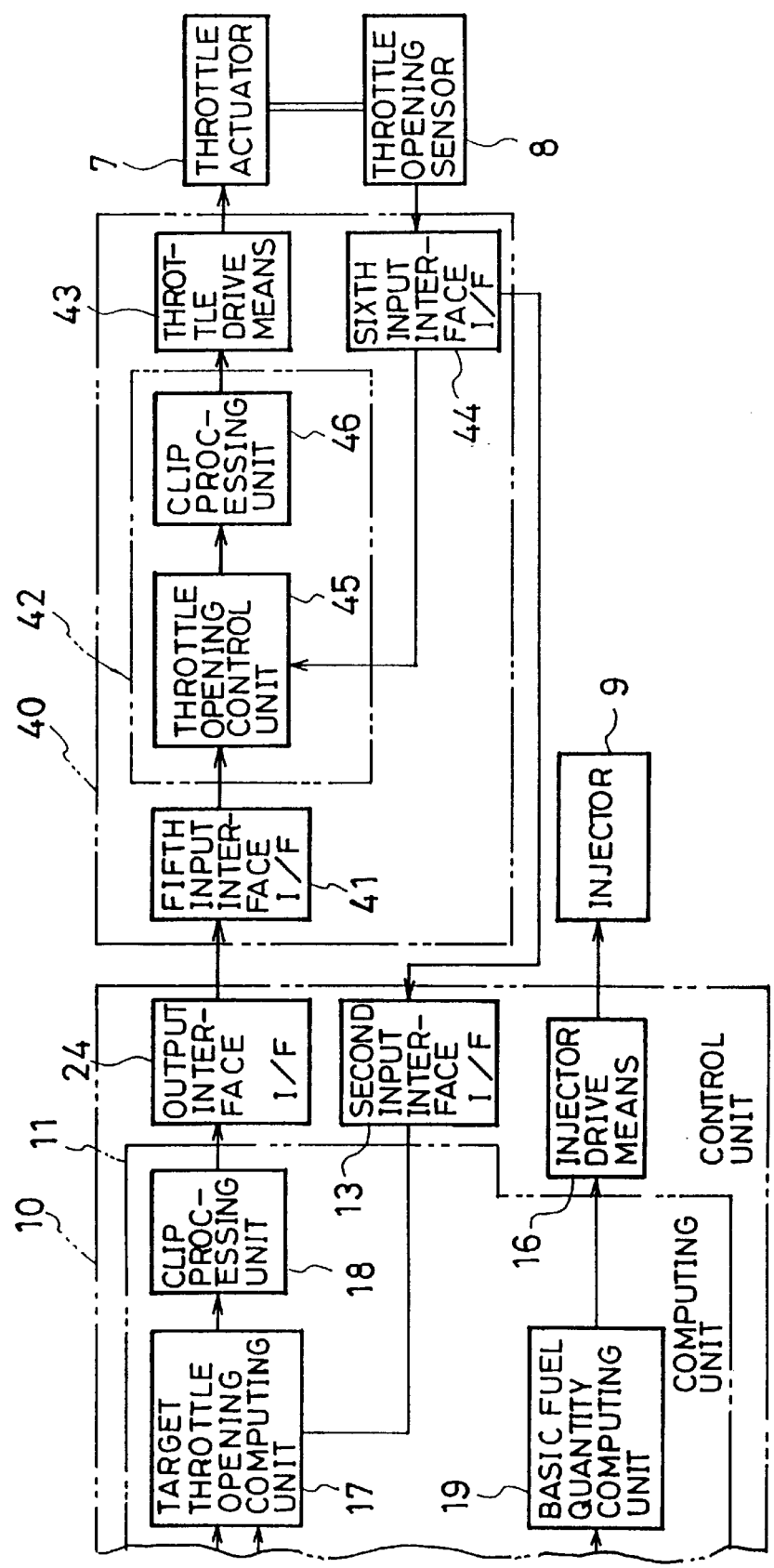
FIG. 13 is a block diagram of a car engine controller according to Embodiment 9 of the present invention.
Figure 14:
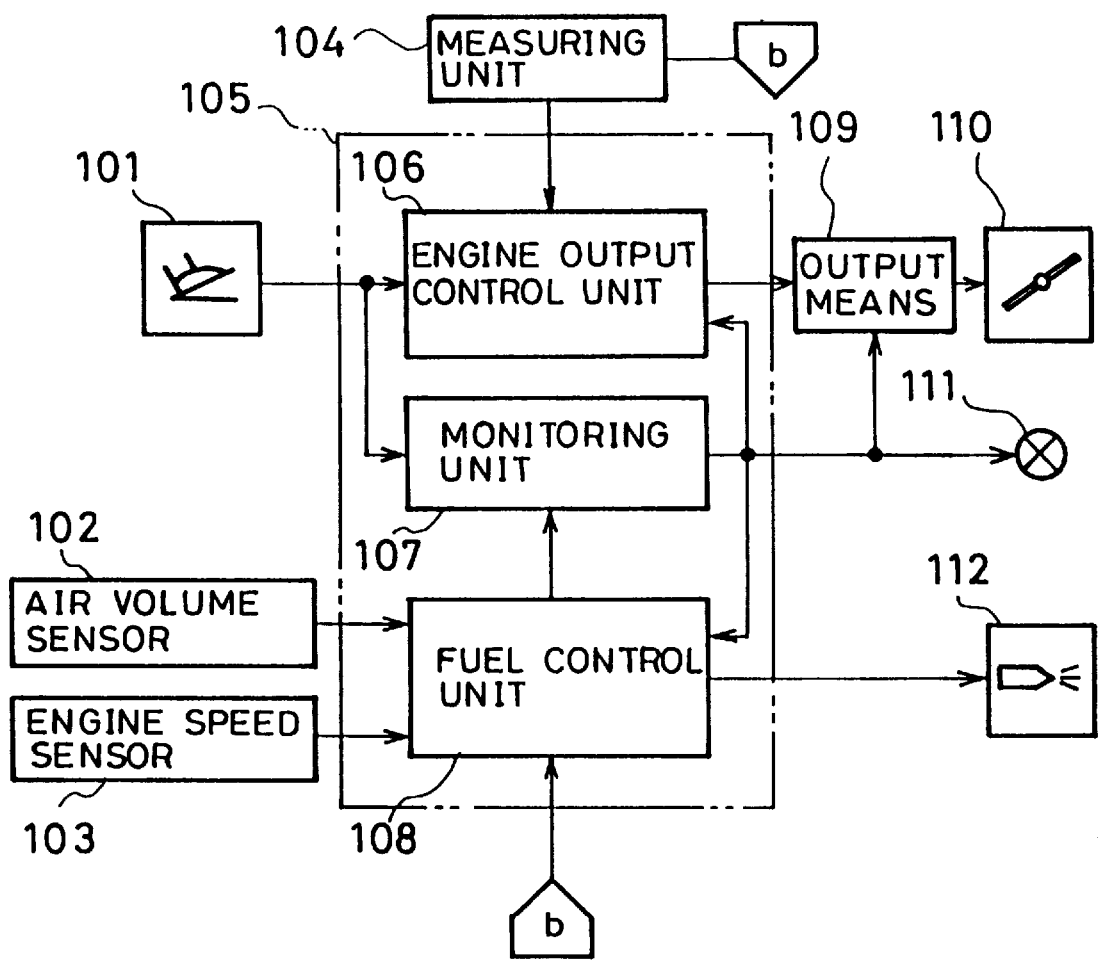
FIG. 14 is a block diagram of a car engine controller of the prior art.

In the above Embodiments, there is only one control unit 10. When there are two control units 10 and 40, the reliability of monitoring is improved. FIG. 13 is a block diagram of a car engine controller according to this Embodiment 9 of the present invention. In FIG. 13, the control unit 10 comprises an output interface 24 in place of the above throttle drive means 15 and the control unit 40 comprises a fifth input interface 41, a computing unit 42 corresponding to the above computing unit 11, throttle drive means 43 corresponding to the above throttle drive means 15 and a sixth input interface 44. The computing unit 42 comprises a throttle opening control unit 45 corresponding to the above target throttle opening computing unit 17 and a clip processing unit 46 corresponding to the above clip processing unit 18. A throttle opening detected by the throttle opening sensor 8 is applied to the throttle opening control unit 45 through the sixth input interface and to the target throttle opening computing unit 17 through the sixth input interface 44 and the second input interface 13. That is, this Embodiment 9 comprises the control unit 10 and the control unit 40 and the computing unit 42 composed of a computer is arranged between the computing unit 11 and the throttle drive means 15 in the above embodiments. Therefore, the double safety of the electronically controlled throttle valve by computer processing can be ensured. In FIG. 13, the accelerator sensor 1, the accelerator fully closing switch 2, the water temperature sensor 3, the engine speed sensor 4, the air volume sensor 5, the air conditioning switch 6, the first input interface 12 and the third input interface 14 shown in FIG. 1 are not shown.

As described above, according to the first aspect of the present invention, when the accelerator opening is smaller than the control variable, the throttle actuator is controlled based on the accelerator opening and when the accelerator opening is larger than the control variable, the throttle actuator is controlled based on the control variable. Therefore, it is possible to prevent the throttle opening from becoming abnormally large with respect to the accelerator opening.

According to the second aspect of the present invention, since the control value can be changed by the temperature of the engine, the output of the engine can be made appropriate when the engine is cold and when the engine is warmed up.

According to the third aspect of the present invention, since the control value can be changed by the temperature of the engine and the burn mode of the engine, exhaust gas from the engine can be made clean while the engine is warmed up and the output of the engine can be made appropriate after the engine is warmed up.

According to the fourth aspect of the present invention, since the burn mode of the engine is changed to a lean burn mode when the difference between the accelerator opening and the throttle opening is large, when the throttle actuator or the throttle valve malfunctions or when the clip value of throttle opening is wrong, the engine is shifted to a lean burn mode, thereby making it possible to prevent the abrupt departure of a car.

According to the fifth aspect of the present invention, since the fuel of the engine is cut when the difference between the accelerator opening and the throttle opening is large, when the throttle actuator or the throttle valve malfunctions or when the clip value of throttle opening is wrong, the fuel of the engine is cut, thereby making it possible to prevent the abrupt departure of a car.

According to the sixth aspect of the present invention, since computers forming electrical computing and control means, burn mode switching means, fuel cutting means and the like are provided, monitoring performance is improved.

What is claimed is:

1. A car engine controller comprising:

means for electrically computing a throttle opening based on a detected accelerator opening;

means for computing a control variable by adding a control value and a value of the detected accelerator opening; and means for controlling a throttle actuator based on the computed throttle opening when the computed throttle opening is smaller than the control variable, and controlling the throttle actuator based on the control variable when the computed throttle opening is larger than the control variable.

2. The car engine controller of claim 1, wherein the control value can be changed by the temperature of an engine.

3. The car engine controller of claim 1, wherein the control value can be changed by the temperature and burn mode of an engine.

4. The car engine controller of claim 1, wherein said engine controller comprises a plurality of computers forming at least one of electrical computing and control means, burn mode switching means, and fuel cutting means.

5. A car engine controller for controlling a throttle actuator based on a throttle opening which is electrically computed based on a detected accelerator opening and a detected throttle opening, the controller comprising:

input means for receiving signals for the detected accelerator opening and the throttle opening;

means for switching a burn mode of an engine to a lean burn mode when a difference between the accelerator opening and the throttle opening is greater than a predetermined amount.

6. A car engine controller as claimed in claim 1, wherein the controller comprises means for cutting the fuel of an engine when a difference, between the accelerator opening and one of the computed throttle opening and the detected throttle opening, is greater than a predetermined amount.

* * * * *